(12) United States Patent
Tanahashi et al.

(10) Patent No.: US 9,955,562 B2
(45) Date of Patent: Apr. 24, 2018

(54) ENGINE AND METHOD OF PRODUCTION OF ENGINE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 351 days.

(21) Appl. No.: 14/922,385

(22) Filed: Oct. 26, 2015

(65) Prior Publication Data

US 2016/0192463 A1 Jun. 30, 2016

(30) Foreign Application Priority Data

Dec. 26, 2014 (JP) ................. 2014-265722

(51) Int. Cl.
| | |
|---|---|
| *H05F 3/00* | (2006.01) |
| *B60K 13/02* | (2006.01) |
| *B60R 16/06* | (2006.01) |
| *F02M 35/10* | (2006.01) |
| *F02M 35/104* | (2006.01) |
| *F02F 7/00* | (2006.01) |
| *F01L 1/02* | (2006.01) |
| *F02B 67/06* | (2006.01) |

(Continued)

(52) U.S. Cl.
CPC ............... *H05F 3/00* (2013.01); *B60K 13/02* (2013.01); *B60R 16/06* (2013.01); *F01L 1/024* (2013.01); *F02B 67/06* (2013.01); *F02B 77/13* (2013.01); *F02F 7/006* (2013.01); *F02M 35/104* (2013.01); *F02M 35/10242* (2013.01); *F02M 35/10249* (2013.01); *F02M 35/10321* (2013.01); *F15D 1/06* (2013.01)

(58) Field of Classification Search
CPC ........................................................ H05F 3/00
See application file for complete search history.

(56) References Cited

U.S. PATENT DOCUMENTS

| | | | | |
|---|---|---|---|---|
| 5,825,605 | A * | 10/1998 | Sutherland | B60R 16/06 361/216 |
| 8,432,658 | B1 * | 4/2013 | Heise | F01N 13/16 361/216 |

(Continued)

FOREIGN PATENT DOCUMENTS

| | | |
|---|---|---|
| CN | 203255258 U | 10/2013 |
| JP | H03-140216 A | 6/1991 |

(Continued)

*Primary Examiner* — Stephen W Jackson
(74) *Attorney, Agent, or Firm* — Andrews Kurth Kenyon LLP

(57) ABSTRACT

An engine comprising an engine body and a nonconductive engine part attached to the engine body which are positively charged. A self-discharge type static eliminator is provided which, if placed on the nonconductive engine part, can lower the amount of carried charge on the wall surface of the nonconductive engine part in a limited range centered about the location of the placement of the static eliminator. The self-discharge type static eliminator is placed on the outer wall surface of the connecting part of the engine part to the engine body to whereby eliminate a static electricity from the engine body.

20 Claims, 7 Drawing Sheets

(51) Int. Cl.
*F15D 1/06* (2006.01)
*F02B 77/13* (2006.01)

(56) References Cited

U.S. PATENT DOCUMENTS

| | | | |
|---|---|---|---|
| 8,932,464 B2* | 1/2015 | Byrd | B01D 35/26 210/172.1 |
| 2006/0213422 A1* | 9/2006 | Zimmermann | B60K 13/04 116/278 |
| 2014/0209209 A1 | 7/2014 | Aitken | |
| 2015/0327352 A1* | 11/2015 | Kikuchi | E01H 1/0809 417/364 |
| 2016/0108868 A1 | 4/2016 | Tanahashi et al. | |
| 2016/0186639 A1* | 6/2016 | Tanahashi | F01N 13/16 361/217 |

FOREIGN PATENT DOCUMENTS

| | | |
|---|---|---|
| JP | H05-238438 A | 9/1993 |
| JP | 2002-104106 A | 4/2002 |
| JP | 2005-291168 A | 10/2005 |
| JP | 2016078640 A | 5/2016 |
| WO | 2013/061650 A1 | 5/2013 |
| WO | 2015/064195 A1 | 5/2015 |

* cited by examiner

ENGINE AND METHOD OF PRODUCTION OF ENGINE

RELATED APPLICATIONS

This application claims priority to Japanese Patent Application No. 2014-265722, filed on Dec. 26, 2014, the disclosure of which is hereby incorporated by reference in its entirety.

TECHNICAL FIELD

The present invention relates to an engine and a method of production of an engine.

BACKGROUND ART

Known in the art is a vehicle in which a discharge antenna or other discharge device is attached to an engine of a vehicle or a member related to the engine to discharge and release to the outside the high voltage electricity, static electricity, etc. which is generated or stored at the engine part and thereby improve the fuel economy (for example, see Japanese Patent Publication No. 5-238438A).

SUMMARY

Technical Problem

As described in the above patent literature, it has been known that vehicles carry static electricity and that the static electricity has some sort of effect on vehicle operation. However, what kind of effect static electricity has on the operation of a vehicle and the specific reason for that effect is not well known. Without a full understanding of the effects of static electricity, which is carried in a vehicle, has on the operation of the vehicle and the specific reasons for those effect, it is not possible to suitably cope with static electricity which the vehicle carries.

Therefore, the inventors focused on nonconductive engine parts that are attached to the engine body and investigated what kind of effect static electricity which a vehicle carries has on the operation of the vehicle and the specific reasons for these effects. As a result of their investigation, the inventors discovered that the static electricity which a nonconductive engine part carries has a large effect on the engine output and discovered, based on this fact, a suitable method of eliminating static electricity which is required for improving the engine output.

Solution to Problem

That is, according to embodiments of the present invention, there is provided an engine including
an engine part formed from a nonconductive material and attached to an engine body, the engine body and the engine part carrying a positive charge, and
a self-discharge type static eliminator which is placed on a nonconductive engine part and can lower an amount of charge carried on a wall surface of the nonconductive engine part in a limited range centered about a location of placement of the static eliminator. The self-discharge type static eliminator is placed on an outer wall surface of a connecting part of the engine part to the engine body to thereby eliminate static electricity of the engine body.

Furthermore, according to an embodiment of the present invention, there is provided a method of production of an engine in which an engine body and a nonconductive engine part attached to the engine body carry a positive charge, the method including
using a self-discharge type static eliminator which is placed on a nonconductive engine part and can lower an amount of charge carried on a wall surface of the nonconductive engine part in a limited range centered about a location of placement of said static eliminator. The method further includes
finding a position for placement of the self-discharge type static eliminator on an outer wall surface of a connecting part of the engine part to the engine body where static electricity of the engine body can be eliminated after placing the self-discharge type static eliminator, and
placing the self-discharge type static eliminator at this placement position.

Advantageous Effects of Embodiments of the Present Invention

Static electricity is eliminated from the engine by placing the self-discharge type static eliminator on the outer wall surface of the connecting part of the engine part to the engine body. As a result, the intake resistance and exhaust resistance of the engine are reduced and the viscosity of the lubricating oil of the valve operating mechanism and the piston operating mechanism are reduced and the engine output can be improved.

DESCRIPTION OF EMBODIMENTS

Figure 1A:
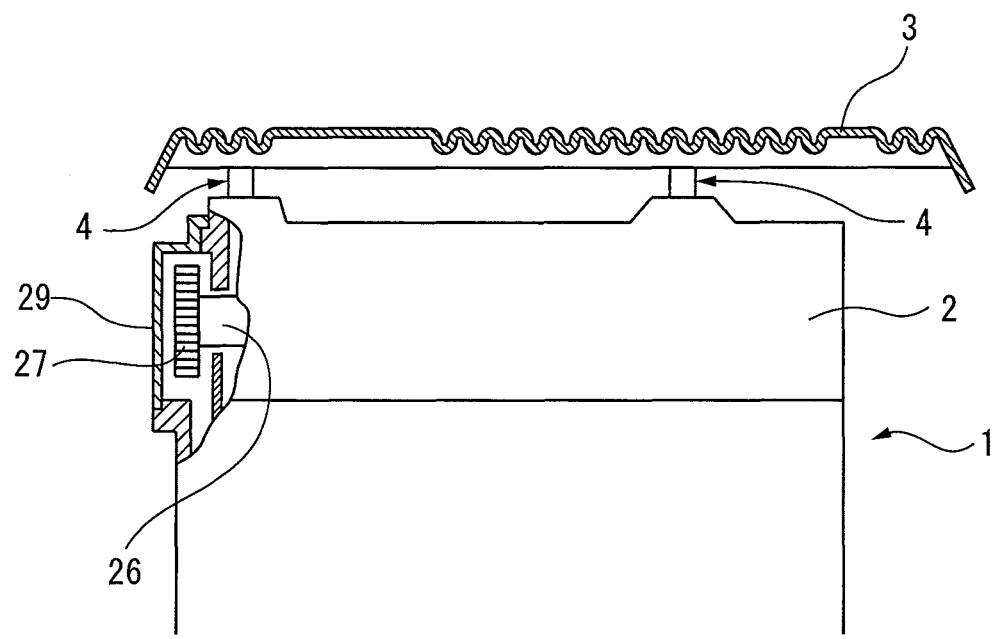
FIGS. 1A and 1B are views for explaining a connecting part of a noise suppressing cover with a cylinder head cover.
Figure 1B:
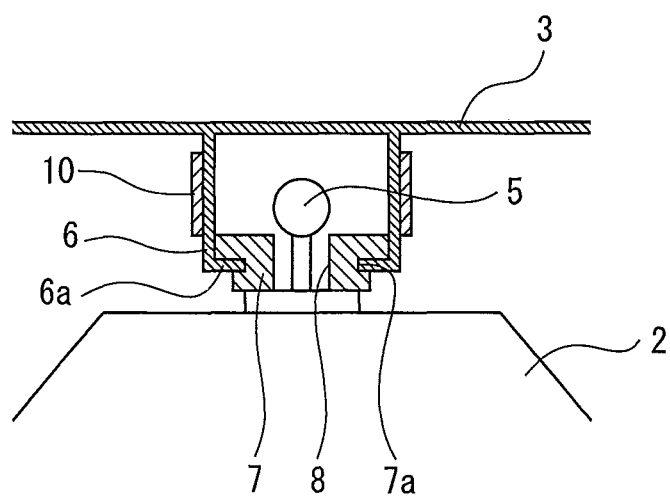

FIG. 1A is a partial cross-sectional side view of a schematically shown engine body. Referring to FIG. 1A, 1 indicates a metal engine body, 2 a metal cylinder head cover, and 3 a noise suppressing cover made of a nonconductive plastic for preventing noise generated by the engine from propagating to the outside. As shown in FIGS. 1A and 1B, this noise suppressing cover 3 is connected through a connection mechanism 4 to the top of the cylinder head cover 2. FIG. 1B shows a side cross-sectional view of this connection mechanism 4. As shown in FIG. 1B, this connection mechanism 4 is comprised of a projection 5 which is formed on the cylinder head cover 2 and projects upward, a tubular part 6 which is integrally formed on the bottom surface of the noise suppressing cover 3 and extends from the bottom surface of the noise suppressing cover 3 downward, and a rubber ring 7. This tubular part 6 is also formed from a nonconductive plastic material.

A ring-shaped flange 6a which extends toward the inside is formed at the bottom end part of the tubular part 6, and an outer circumferential groove 8a which can be fitted onto the ring-shaped flange 6a is formed on the outer circumferential surface of the rubber ring 7. As shown in FIG. 1B, the rubber ring 7 is fastened to the tubular part 6 by fitting the outer circumferential groove 7a of the rubber ring 7 onto the ring-shaped flange 6a of the tubular part 6. On the other hand, the rubber ring 7 has a cylindrical hole 8 of a diameter somewhat smaller than the spherical head of the projection 5 at the center part of the rubber ring 7. By pushing the cylindrical hole 8 of this rubber ring 7 over the spherical head of the projection 5, the noise suppressing cover 3 is connected to the cylinder head cover 2. In this way, the noise suppressing cover 3 is detachably attached to the cylinder head cover 2.

Now then, when the vehicle is running, the different parts of the tires repeatedly contact and separate from the road surface causing static electricity to be generated. Further, the component parts of the engine and the component parts of the brake system move relative to each other also causing static electricity to be generated. Further, when the vehicle is running, air flows while contacting the outer circumferential surface of the vehicle with friction whereby static electricity is generated as well. Due to the static electricity which is thus generated, the body of the vehicle, engine, etc. carry a charge. Even the noise suppressing cover 3 which is made of a nonconductive plastic material carries a charge. At this time, it has been confirmed that the surfaces of the engine body 1, cylinder head cover 2, and noise suppressing cover 3 carry a positive charge. Further, it has been confirmed that the value of the voltage at the surfaces of the engine body 1, cylinder head cover 2, and noise suppressing cover 3 becomes a high voltage of 1000V or more.

Figure 6A:
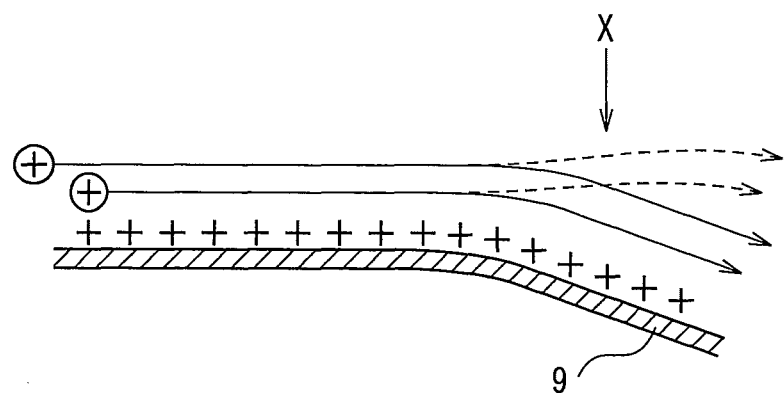
FIGS. 6A and 6B are views for explaining changes in an air flow.

In this regard, it was confirmed that if the value of the voltage of the surface of a thin wall, which is made of a nonconductive plastic material, becomes higher, the flow of air along the surface of the thin wall changes. Therefore, first, how the flow of air along the surface of the thin wall changes due to the value of the voltage of the surface of the thin wall will be explained from phenomena which the inventors have confirmed by experiments. FIG. 6A shows the case where air flows along the surface of a thin wall 9 which carries a positive charge. In this case, the air tends to be positively charged, so FIG. 6A shows the case where the positively charged air flows along the surface of the thin wall 9 which carries a positive charge. Now then, in FIG. 6A, the solid line arrows show the case where the value of the voltage of the surface of the thin wall 9 is low. In this case, the air flows along the surface of the thin wall 9. As opposed to this, the broken line arrows show the case where the value of the voltage of the surface of the thin wall 9 is high. In this case, air flows so as to be separated from the surface of the thin wall 9 where the surface of the thin wall 9 curves downward, that is, where the flow of air easily separates from the surface of the thin wall 9.

Figure 6B:
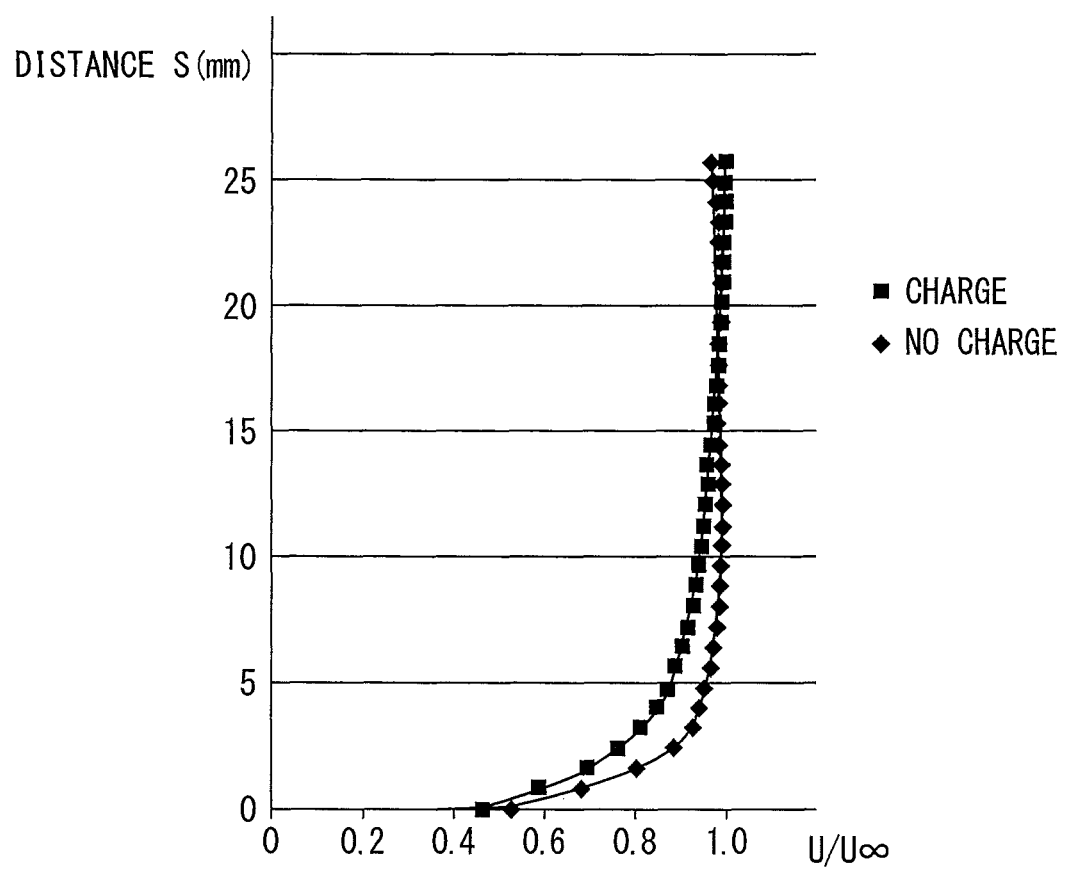

FIG. 6B shows the measured value at the point X (FIG. 6A) of the speed ratio $U/U_\infty$ of the flow rate $U_\infty$ of the main flow of the air which flows along the surface of the thin wall 9 at FIG. 6A and the flow rate U at a position separated from the surface of the thin wall 9 by exactly the distance S (FIG. 6A). Note that the points that are shown by the blacked out diamond shapes in FIG. 6B show the case where the surface of the thin wall 9 does not carry a positive charge. In FIG. 6B, the points that are shown by the blacked out square shapes show the case where the surface of the thin wall 9 carries a positive charge. From FIG. 6B, it will be understood that when the surface of the thin wall 9 carries a positive charge, compared to when the surface of the thin wall 9 does not carry a positive charge, the velocity boundary layer separates from the surface of the thin wall 9. Therefore, when the surface of the thin wall 9 carries a positive charge, as shown by the broken line arrows in FIG. 6A, air flows so as to separate from the surface of the thin wall 9.

As explained above, air tends to be positively charged. Therefore, part of the air becomes positive air ions (shown by circles with + marks). Therefore, if the surface of the thin wall 9 carries a positive charge, a repulsive force acts between the positive air ions and the surface of the thin wall 9. As shown by the broken line arrows in FIG. 6A, the air flows so as to separate from the surface of the thin wall at the location where the surface of the thin wall 9 curves downward, that is, the location where the flow of air easily separates from the surface of the wall surface 9. In this way, it has been confirmed by experiments that the surface of the thin wall 9 carrying a positive charge causes the flow of air along the surface of the thin wall 9 to separate from the surface of the thin wall 9. In this case, it has been learned that the higher the value of the voltage at the surface of the thin wall 9, the more the flow of air which flows along the surface of the thin wall 9 is separated from the surface of the thin wall 9.

Further, it has been confirmed that if the surface shape of the thin wall 9 is a shape whereby the flow of air easily peels off, then when the surface of the thin wall 9 does not carry a positive charge, the flow of air will not peel off, but when the surface of the thin wall 9 carries a positive charge, the flow of air will sometimes peel off. Furthermore, it has been confirmed that when the surface of the thin wall 9 carries a positive charge, compared with the case where the surface of the thin wall 9 does not carry a positive charge, the magnitude of peeling of the air flow increases. It has been confirmed that if, in this way, the surface of the thin wall 9 carries a positive charge, due to the electric repulsive force, the flow of air separates from the surface of the thin wall 9 or air peels off.

Now then, as explained above, it has been confirmed that the value of the voltage at the engine body 1, the cylinder head cover 2, and the noise suppressing cover 3 becomes a high voltage of 1000V or more. In this case, if judged from the experimental results which are shown in FIGS. 6A and 6B, due to this high voltage, the flow of intake air and the flow of exhaust gas which flow through the inside of the engine body 1 are changed. Due to this, it is presumed that the engine output is affected. Therefore, the inventors conducted experiments on the action of inflow of intake air and the action of outflow of exhaust gas and as a result learned that if the value of the voltage of the engine body 1 becomes a high voltage, the intake resistance and exhaust resistance increase and as a result the engine output is reduced.

Figure 5:
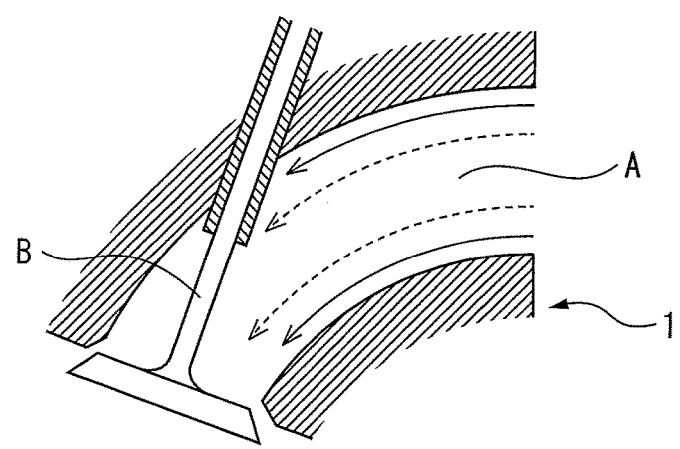
FIG. 5 is a view for explaining a flow of intake air.

Next, the reason why the engine output is reduced if the value of the voltage of the engine body 1 becomes a high voltage will be simply explained while referring to FIG. 5. Note that FIG. 5 shows an intake port A and an intake valve B which are formed in the engine body 1. The intake air which flows into the intake port A is fed through the intake valve B to the inside of a combustion chamber. In FIG. 5, the solid line arrows show the flow of intake air in the intake port A when the voltage of the engine body 1 is low. At this time, the intake air flows along the inner circumferential wall surfaces of the intake port A as shown by the solid line arrows.

As opposed to this, if the static electricity which is carried causes the voltage of the engine body 1 to become higher, as shown by the broken line arrows in FIG. 5, the positively charged intake air which flows along the inner circumferential wall surfaces of the intake port A is separated from the inner circumferential wall surfaces of the intake port A by the electrical repulsion force. As a result, the intake air has to flow through a location separated from the inner circumferential wall surfaces of the inside of the intake port A. If the intake air has to flow through a location separated from the inner circumferential wall surfaces of the inside of the intake port A, as will be understood from the broken line arrows in FIG. 5, the flow cross-section of the intake air is reduced and the intake resistance increases. As a result, the amount of intake air decreases and the engine output is reduced.

On the other hand, the same can be said for the exhaust gas which flows through the inside of an exhaust port. That is, if the static electricity which is carried causes the voltage of the engine body 1 to rise, the positively charged exhaust gas which flows along the inner circumferential wall surfaces of the exhaust port is separated from the inner circumferential wall surfaces of the exhaust port by the electrical repulsion force. As a result, the exhaust gas has to flow through a location separated from the inner circumferential wall surfaces of the exhaust port. If the exhaust gas has to flow through a location separated from the inner circumferential wall surfaces of the exhaust port, in the same way as the case of the flow of intake air, the flow cross-section of the exhaust gas is reduced and the exhaust resistance increases. As a result, the exhaust pressure becomes higher and the engine output is reduced. Therefore, in this case, if the voltage of the engine body 1 is made to fall, the flow cross-section of the intake air and flow cross-section of the exhaust gas increase and the engine output is improved.

Further, it is known that the lubricating oil for lubricating the valve operating mechanism and the piston operating mechanism becomes higher in viscosity if the voltage which is applied to the lubricating oil becomes higher. Therefore, if the static electricity which is carried causes the voltage of the engine body 1 to become higher, the voltage which is applied to the lubricating oil becomes higher. As a result, the viscosity of the lubricating oil becomes higher. If the viscosity of the lubricating oil becomes higher, excess power is used for operating the valve operating mechanism and the piston operating mechanism and, as a result, the engine output is reduced. Therefore, in this case, if lowering the voltage of the engine body 1, the power which is used for operating the valve operating mechanism or piston piston operating mechanism can be decreased and the engine output can be raised.

When lowering the voltage of the engine body 1 in this way, it is possible to make the engine output rise. Therefore, the inventors engaged in repeated studies on a method of lowering the voltage of the engine body 1 and as a result discovered that when decreasing the charge which is carried at the connecting part of the nonconductive engine part with the engine body, it is possible to lower the voltage of the engine body 1. To achieve this, the engine body 1 is supported by the vehicle body or chassis through a rubber engine mount. The voltage of the engine body 1 fluctuates up and down in accordance with the voltage of the nonconductive engine part. On the other hand, when decreasing the charge that is carried at the connecting part of the nonconductive engine part with the engine body, the voltage of the connecting part of the engine part with the engine body is reduced. If the voltage of the connecting part of the engine part with the engine body is reduced, the voltage of the engine body 1 is reduced. Therefore, if decreasing the charge which is carried at the connecting part of the engine part with the engine body, the voltage of the engine body 1 is reduced.

Therefore, the inventors studied simple methods of static elimination for reducing the charge carried at the connecting part of an engine part with the engine body and discovered a simple method of static elimination which uses a self-discharge type static eliminator. One example of this self-discharge type static eliminator is shown from FIG. 7A to FIG. 7C. Note that, FIG. 7A and FIG. 7B show a plan view and side cross-sectional view of a typical self-discharge type static eliminator 10, while FIG. 7C shows a side cross-sectional view of another self-discharge type static eliminator 10.

Figure 7A:
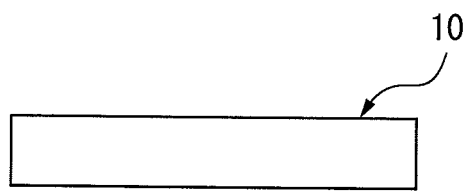
FIGS. 7A, 7B, and 7C are views which show a self-discharge type static eliminator.
Figure 7B:
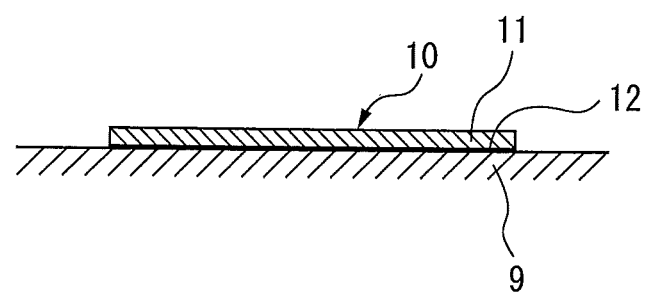
Figure 7C:
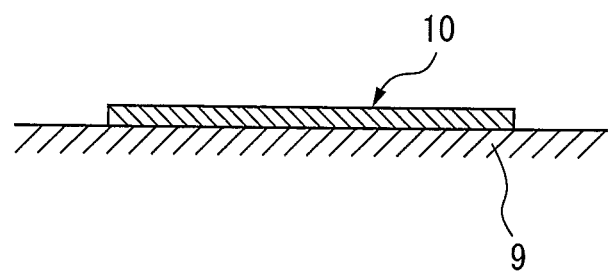

In the example which is shown in FIG. 7A and FIG. 7B, this self-discharge type static eliminator 10 forms an elongated rectangular planar shape and is comprised of metal foil 11 which is bonded to the surface of the thin wall 9 by a conductive adhesive 12. On the other hand, in the example which is shown in FIG. 7C, this self-discharge type static eliminator 10 comprises a conductive thin film which is formed integrally on the surface of the thin wall 9. In an embodiment of the present invention, this self-discharge type static eliminator 10 is used to eliminate static electricity from the engine body 1. Note that, before explaining the method of static elimination of this engine body 1, the basic method of static elimination using the self-discharge type static eliminator 10 according to an embodiment of the present invention will be explained first with reference to the example of the case of using the self-discharge type static eliminator 10 to eliminate static electricity from the surface of the thin wall 9.

Figure 8A:
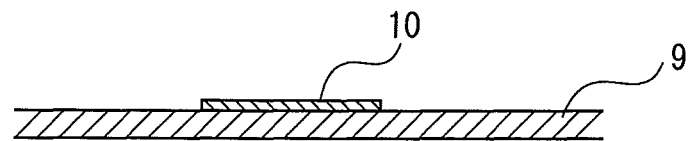
FIGS. 8A and 8B are views for explaining a static eliminating action according to a self-discharge type static eliminator.
Figure 8B:
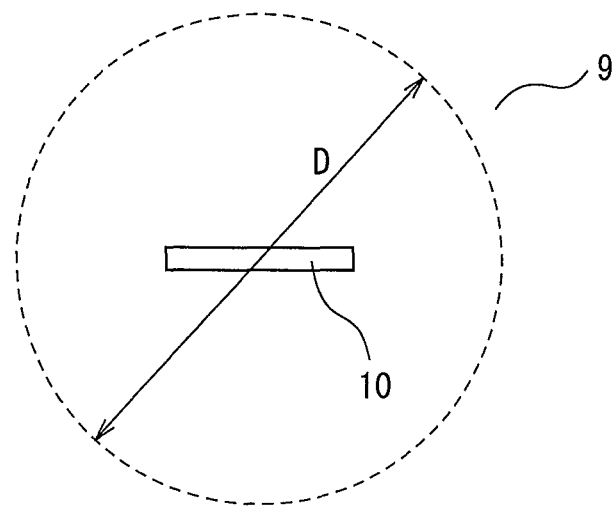

FIG. 8A shows the case of placing the self-discharge type static eliminator 10 which is shown in FIGS. 7A and 7B on the surface of the thin wall 9. It is confirmed that if placing the self-discharge type static eliminator 10 on the surface of the thin wall 9 in this way, as shown in FIG. 8B, the amount of charge carried on the surface of the thin wall 9 in the limited range shown by the broken line centered at the location of placement of the self-discharge type static eliminator 10 is lowered and, as a result, the voltage of the surface of the thin wall 9 in the limited range shown by the broken line in FIG. 8B is lowered.

Figure 9A:
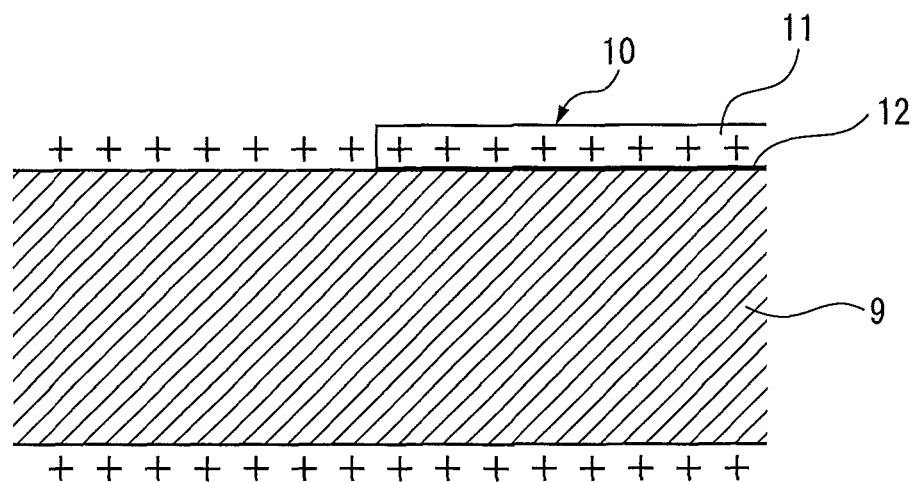
FIGS. 9A and 9B are views for explaining a self-discharge action.

In this case, the mechanism of static elimination by which the self-discharge type static eliminator 10 eliminates the static electricity at the surface of the thin wall 9 is not clear, but it guessed that probably the action of discharge of the positive charge from the self-discharge type static eliminator 10 causes an action of elimination of static electricity at the surface of the thin wall 9 around the location of placement of the self-discharge type static eliminator 10. Next, while referring to FIG. 9A and FIG. 9B which shows an enlarged view of the end part of the self-discharge type static eliminator 10 which is shown in FIG. 9A, the mechanism of static elimination which is presumed to occur at the surface of the thin wall 9 will be explained.

As explained above, the thin wall 9 is formed from a nonconductive plastic material. If in this way the thin wall 9 is formed from a nonconductive plastic material, the inside of the thin wall 9 will not carry a charge, but the surface of the thin wall 9 will carry a charge. Note that, it is confirmed that the surface of the noise suppressing cover 3 which is shown in FIG. 1 carries a positive charge. In the embodiment which is shown in FIGS. 1A and 1B, to eliminate static electricity of the engine body 1, static electricity is eliminated at the outer wall surface of the connecting part of the noise suppressing cover 3 with the engine body 1. Therefore, assuming the case of eliminating static electricity from the outer wall surface of the connecting part of the noise suppressing cover 3 from the engine body 1, FIG. 9A shows the case where the surface of the thin wall 9 carries a positive charge. On the other hand, as explained above, the self-discharge type static eliminator 10 is comprised of metal foil 11 which is bonded by a conductive adhesive 12 to the surface of the thin wall 9. The metal foil 11 and conductive adhesive 12 are both conductive. Therefore, the inside of the metal foil 11, that is, the inside of the self-discharge type static eliminator 10, carries a positive charge.

In this regard, the voltage of the self-discharge type static eliminator 10 becomes substantially equal to the voltage of the surface of the thin wall 9 around the self-discharge type static eliminator 10. Therefore, the voltage of the self-discharge type static eliminator 10 becomes considerably high. On the other hand, as explained above, air tends to be positively charged. Therefore, part of the air becomes positive air ions (shown by circles with + marks). In this case, if comparing the potential of the air ions and the potential of the self-discharge type static eliminator 10, the potential of the self-discharge type static eliminator 10 becomes considerably higher than the potential of the air ions. Therefore, if the air ions, as shown in FIG. 9B, for example, approach the corner portions 13 of the self-discharge type static eliminator 10, the field strength between the air ions and the corner portions 13 of the self-discharge type static eliminator 10 becomes higher and, as a result, discharge occurs between the air ions and the corner portions 13 of the self-discharge type static eliminator 10.

Figure 9B:
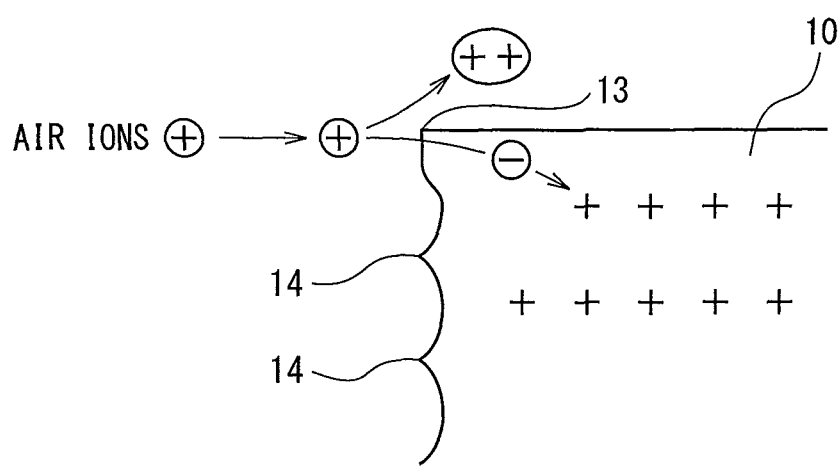

If discharge occurs between the air ions and the corner portions 13 of the self-discharge type static eliminator 10, as shown in FIG. 9B, part of the electrons of the air ions moves to the inside of the self-discharge type static eliminator 10, so the amount of positive charge of air ions increases (shown by circles with ++ marks) and the electrons which move through the inside of the self-discharge type static eliminator 10 cause the positive charge carried by the self-discharge type static eliminator 10 to be neutralized. Once the discharge occurs, discharge easily occurs. If other air ions approach the corner portions 13 of the self-discharge type static eliminator 10, discharge immediately occurs between the air ions and the corner portions 13 of the self-discharge type static eliminator 10. That is, if air around the self-discharge type static eliminator 10 moves, air ions successively approach the corner portions 13 of the self-discharge type static eliminator 10. Therefore, continuous discharge occurs between the air ions and the corner portions 13 of the self-discharge type static eliminator 10.

If discharge continuously occurs between the air ions and the corner portions 13 of the self-discharge type static eliminator 10, the positive charge which is carried at the self-discharge type static eliminator 10 gradually is neutralized. As a result, the amount of positive charge which is carried at the self-discharge type static eliminator 10 decreases. If the amount of positive charge which is carried at the self-discharge type static eliminator 10 decreases, the positive charge which is carried on the surface of the thin wall 9 around the self-discharge type static eliminator 10 moves through the inside of the self-discharge type static eliminator 10. Therefore, the positive charge which is carried on the surface of the thin wall 9 around the self-discharge type static eliminator 10 is decreased. As a result, the voltage at the surface of the self-discharge type static eliminator 10 and the thin wall 9 surrounding the self-discharge type static eliminator 10 gradually falls. This reduction of the voltage at the surface of the self-discharge type static eliminator 10 and the thin wall 9 surrounding the self-discharge type static eliminator 10 continues until the voltage of the self-discharge type static eliminator 10 becomes lower and the discharge action stops. As a result, as shown in FIG. 8B, the voltage of the surface of the thin wall 9 is reduced in a limited range shown by the broken line centered about the location of placement of the self-discharge type static eliminator 10.

On the other hand, as explained above, if discharge occurs between the air ions and the corner portions 13 of the self-discharge type static eliminator 10, as shown in FIG. 9B, air ions with an increased amount of positive charge (shown by circles with ++ marks) are generated. The air ions with an increased amount of positive charge scatter in the surrounding air. The amount of air ions with an increased amount of positive charge is extremely small compared with the amount of air which flows through the surroundings of the self-discharge type static eliminator 10. Note that, if the air around the self-discharge type static eliminator 10 stagnates and the air ions do not move, discharge does not continuously occur and the voltage of the surface of the thin wall 9 does not decrease. That is, to make the voltage of the surface of the thin wall 9 decrease, it becomes necessary to make the air around the self-discharge type static eliminator 10 flow.

Discharge between the air ions and the self-discharge type static eliminator 10 occurs between the air ions and the corner portions 13 of the self-discharge type static eliminator 10 or between the air ions and the sharp projections 14 at the peripheral parts of the self-discharge type static eliminator 10. Therefore, to make it easier for discharge to occur between the air ions and the self-discharge type static eliminator 10, it can be said to be preferable to form a large number of sharp projections 14 in addition to the corner portions 13 at the peripheral parts of the self-discharge type static eliminator 10. Therefore, when preparing the self-discharge type static eliminator 10, if cutting large dimension metal foil to prepare the metal foil 11, it is preferable to cut the metal foil so that burrs like sharp projections 14 occur at the cut surface.

The metal foil 11 of the self-discharge type static eliminator 10 which is shown in FIGS. 7A and 7B is comprised of a ductile metal, for example, aluminum or copper. In this embodiment according to the present invention, the metal foil 11 is comprised of aluminum foil. Further, the length in the long direction of the aluminum foil 11 which is used in this embodiment according to the present invention is 50 mm to 100 mm or so, while the thickness is 0.05 mm to 0.2 mm or so. In this case, the diameter D of the limited range where the voltage drops, which is shown by the broken line in FIG. 8B, becomes 150 mm to 200 mm or so. Note that, as the self-discharge type static eliminator 10, it is also possible to cut and use aluminum tape comprised of aluminum foil 11 formed with a layer of a conductive adhesive 12. Furthermore, the self-discharge type static eliminator 10, as shown in FIG. 7C, can also be comprised of a conductive thin film which is integrally formed on the surface of the thin wall 9. In this case as well, at the side parts of the conductive thin film, it is preferable to form a large number of sharp projections 14 in addition to the corner portions 13 such as shown in FIG. 9B.

In this embodiment according to the present invention, as shown in FIG. 1B, the self-discharge type static eliminator 10 is placed on the outer wall surface of the connecting part of the noise suppressing cover 3 with the engine body 1, that is, the outer wall surface of the tubular part 6 of the noise suppressing cover 3. In this case, in the embodiment which is shown in FIG. 1B, the self-discharge type static eliminator 10 is placed on the outer wall surface of the tubular part 6 so as to extend in the outer peripheral direction of the tubular part 6. If, in this way, the self-discharge type static eliminator 10 is placed on the outer wall surface of the tubular part 6, due to the static elimination action of the self-discharge type static eliminator 10, the charge in a certain range centered about the self-discharge type static eliminator 10 is eliminated, so the static electricity of the entirety of the outer wall surface of the tubular part 6 and the entirety of the rubber ring 7 is eliminated. As a result, the voltage of the entirety of the outer wall surface of the tubular part 6 and the entirety of the rubber ring 7 is reduced. If the voltage of the entirety of the outer wall surface of the tubular part 6 and the entirety of the rubber ring 7 is reduced, the voltage of the cylinder head cover 2 and engine body 1 which are connected to the connection mechanism 4 is reduced. As a result, it is possible to improve the output of the engine.

Figure 2:
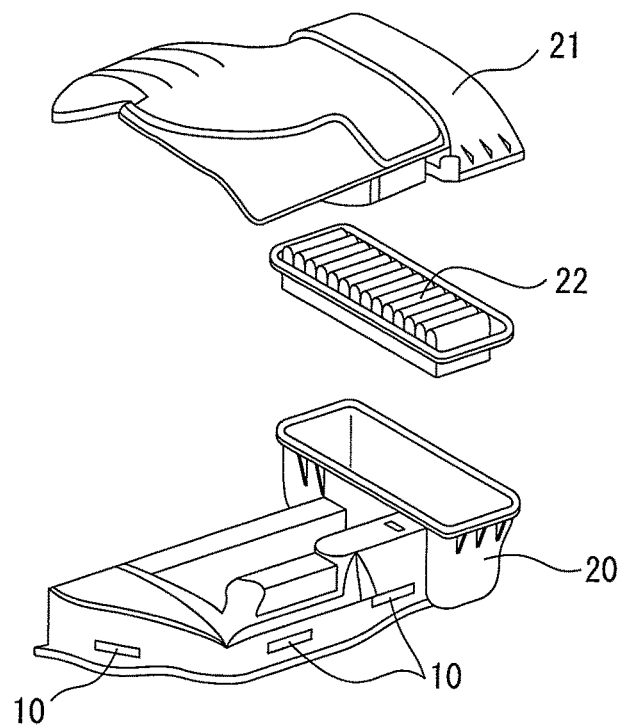
FIG. 2 is a disassembled perspective view of the cylinder head cover.

Next, referring to FIG. 2 to FIG. 4, another embodiment will be explained where the charge which is carried at the connecting part of a nonconductive engine part with the engine body is made to decrease to thereby cause the voltage of the engine body 1 to drop. FIG. 2 shows a nonconductive plastic cylinder head cover which integrally forms part of an air cleaner. Note that, in FIG. 2, 20 shows a nonconductive plastic cylinder head cover body which is attached on the engine body 1, 21 shows an air filter cover, and 22 shows an air filter which is held between the cylinder head cover body 20 and the air filter cover 21.

As shown in FIG. 2, in this embodiment, a plurality of self-discharge type static eliminators 10 are placed on the outer wall surface of the connecting part of the cylinder head cover body 20 with the engine body 1. For example, the self-discharge type static eliminators 10 are placed on the outer wall surface of the connection flange of the cylinder head cover body 20 with the engine body 1. In this embodiment, the voltage of the entirety of the air cleaner becomes a high voltage, but the self-discharge type static eliminators 10 reduce the charge which is carried at the connecting part of the cylinder head cover body 20 with the engine body 1. As a result, the voltage of the connecting part of the cylinder head cover body 20 with the engine body 1 is reduced. Due to this, it becomes possible to improve the engine output.

Figure 3:
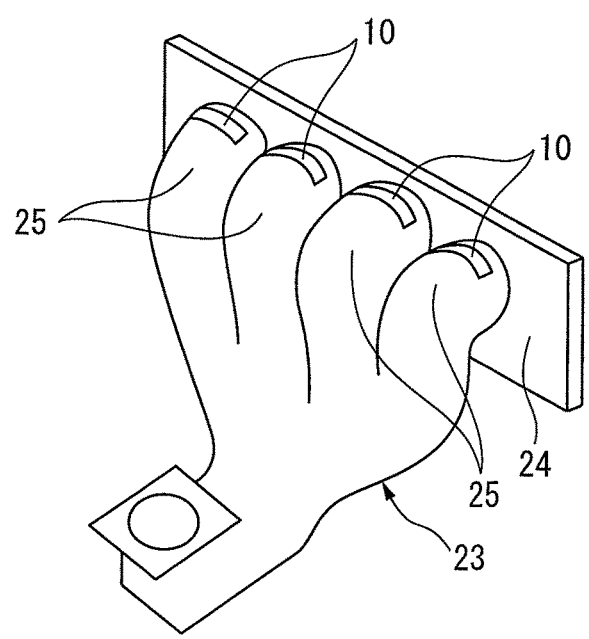
FIG. 3 is a perspective view of an intake manifold.

FIG. 3 shows a nonconductive plastic intake manifold 23. Note that, in FIG. 3, 24 shows a mounting flange to the engine body 1, more accurately the cylinder head, while 25 show intake branch pipes which are formed integrally with the mounting flange 24.

As shown in FIG. 3, in this embodiment, a plurality of self-discharge type static eliminators 10 are placed on the outer wall surface of the connecting part of the nonconductive plastic intake manifold 23 with the engine body 1. Specifically, the self-discharge type static eliminators 10 are placed on the outer wall surfaces of the downstream ends of the intake branch pipes 25. In this embodiment as well, the voltage of the entirety of the intake manifold 23 becomes a high voltage, but the self-discharge type static eliminators 10 cause the charge which is carried at the connecting part of the intake manifold 23 with the engine body 1 to be decreased. As a result, the voltage of the connecting part of the intake manifold 23 with the engine body 1 falls and thereby the output of the engine can be raised.

Figure 4:
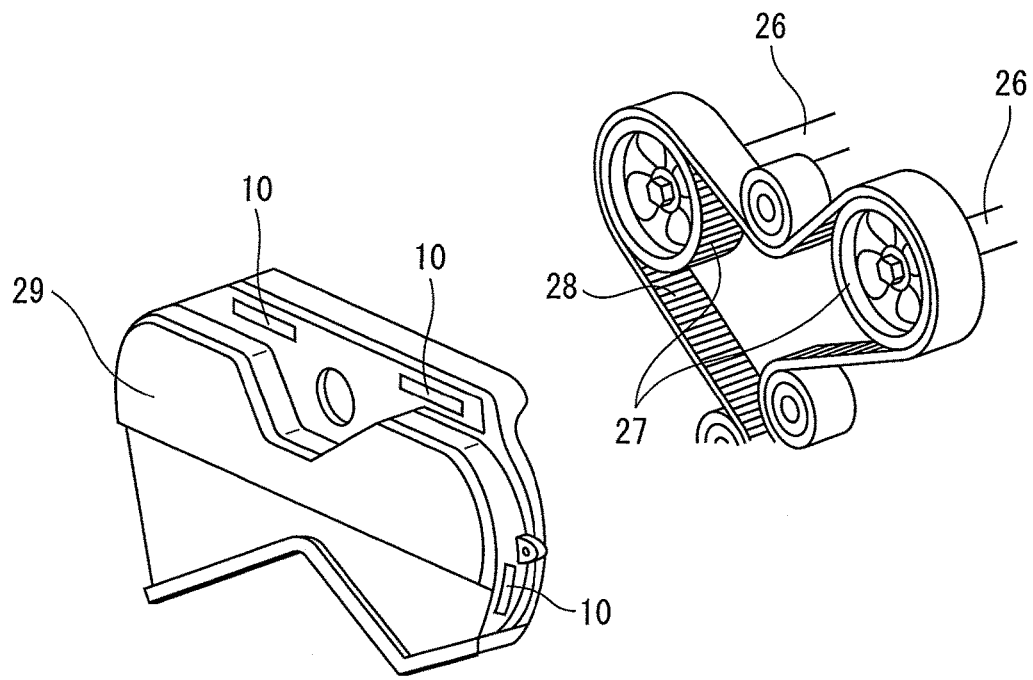
FIG. 4 is a disassembled perspective view of part of a valve operating mechanism and a timing belt cover.

FIG. 4 shows part of a valve operating mechanism and nonconductive plastic timing belt cover. Note that, in FIG. 1A and FIG. 4, 26 shows camshafts for driving the intake valve and exhaust valve, 27 shows timing pulleys which are attached to the ends of the camshafts 26, 28 shows a timing belt, and 29 shows a nonconductive plastic timing belt cover for covering the timing pulleys 27.

As shown in FIG. 4, in this embodiment, a plurality of self-discharge type static eliminators 10 are placed on the outer wall surface of the connecting part of the nonconductive plastic timing belt cover 29 with the engine body 1, more precisely the cylinder head. For example, the self-discharge type static eliminators 10 are placed on the outer wall surface of the connection flange of the timing belt cover 29 with the engine body 1. In this embodiment as well, the voltage of the entirety of the timing belt cover 29 becomes a high voltage, but the self-discharge type static eliminators 10 enable the charge which is carried at the connecting part of the timing belt cover 29 with the engine body 1 to be decreased. As a result, the voltage of the connecting part of the timing belt cover 29 with the engine body 1 is reduced and thereby the engine output can be improved.

In this way, in embodiments of the present invention, by placing the self-discharge type static eliminator 10 on the outer wall surface of a connecting part of a nonconductive engine part to the engine body 1, it is possible to eliminate static electricity from the engine body 1 and lower the voltage of the engine body 1. That is, according to embodiments of the present invention, in the engine which comprises an engine part formed from a nonconductive material and attached to an engine body 1 and in which the engine body 1 and the engine part carry a positive charge, the engine comprises a self-discharge type static eliminator 10 which, if placed on a nonconductive engine part, can lower an amount of charge carried on a wall surface of the nonconductive engine part in a limited range centered about a location of placement of the static eliminator 10, and the self-discharge type static eliminator 10 is placed on an outer wall surface of a connecting part of the engine part to the engine body 1 to thereby eliminate a static electricity of the engine body 1.

In this case, in the embodiment which is shown in FIGS. 1A and 1B, this engine part is comprised of the noise suppressing cover 3 which covers the cylinder head cover 2 of the engine, and the self-discharge type static eliminator 10 is placed on the outer wall surface of the connection part of the noise suppressing cover 3 to the cylinder head cover 2. Note that, in this case, as shown in FIG. 1B, the projection 5 is formed on the cylinder head cover 2 of the engine, and the connection part of the noise suppressing cover 3 to the cylinder head cover 2 is comprised of the tubular part 6 which can engage with the projection 5 and which is integrally formed on the back surface of the noise suppressing cover 3. In addition, the self-discharge type static eliminator 10 is placed on the outer wall surface of the tubular part 6.

On the other hand, in the embodiments which are shown in FIG. 2 to FIG. 4, the engine part is comprised of a nonconductive engine component member which forms part of the engine body 1, and the self-discharge type static eliminators 10 are placed on the outer wall surface of the connection part of the engine component member to the engine body 1. In this case, in the embodiment which is shown in FIG. 2, this engine component member is comprised of the plastic cylinder head cover, in the embodiment which is shown in FIG. 3, this engine component member is comprised of the plastic intake manifold 23, and in the embodiment which is shown in FIG. 4, this engine component member is comprised of the plastic timing belt cover 29.

Note that, in embodiments of the present invention, the placement position of the self-discharge type static eliminator 10, which is on the outer wall surface of the connecting part of the nonconductive engine part with the engine body 1 and enables static electricity of the engine body 1 to be eliminated well if placing the self-discharge type static eliminator 10 thereon, is determined in advance by experimentation, and the self-discharge type static eliminator 10 is placed on these determined placement positions. By placing the self-discharge type static eliminator 10 on the determined placement position in this way, it is possible to eliminate static electricity from the engine body 1 well by the self-discharge type static eliminator 10.

That is, according to embodiments of the present invention, there is provided a method of production of an engine in which an engine body 1 and a nonconductive engine part attached to the engine body 1 carry a positive charge, the method including using a self-discharge type static eliminator 10 which, placed on a nonconductive engine part, can lower an amount of charge carried on a wall surface of the nonconductive engine part in a limited range centered about a location of placement of the static eliminator 10. The method further includes finding a position of placement of the self-discharge type static eliminator 10 on an outer wall surface of a connecting part of the engine part to the engine body 1 where static electricity of the engine body 1 can be eliminated by placing the self-discharge type static eliminator 10 at a predetermined placement position.

In this case as well, in the embodiment which is shown in FIGS. 1A and 1B, this engine part is comprised of the noise suppressing cover 3 which covers the cylinder head cover 2 of the engine, while in the embodiments which are shown in FIG. 2 to FIG. 4, this engine part is comprised of a nonconductive engine component member which forms part of the engine body 1. In this case, similarly, in the embodiment which is shown in FIG. 2, this engine component member is comprised of a plastic cylinder head cover, in the embodiment which is shown in FIG. 3, this engine component member is comprised of a plastic intake manifold 23, and in the embodiment which is shown in FIG. 4, this engine component member is comprised of a plastic timing belt cover 29.

REFERENCE SIGNS LIST 1 engine body
2 cylinder head cover
3 noise suppressing cover
4 connection mechanism
5 projection
6 tubular part
7 rubber ring
10 self-discharge type static eliminator

What is claimed is:

1. An engine comprising:
an engine part formed from a nonconductive material and attached to an engine body, the engine body and the engine part carrying a positive charge, and
a self-discharge type static eliminator to lower an amount of charge carried on a wall surface of the nonconductive engine part in a limited range centered about a location of placement of said self-discharge type static eliminator, said self-discharge type static eliminator being placed on an outer wall surface of a connecting part of the engine part to the engine body to thereby eliminate a static electricity of the engine body.

2. The engine as claimed in claim 1, wherein said engine part is comprised of a nonconductive plastic material.

3. The engine as claimed in claim 1, wherein said engine part is comprised of a noise suppressing cover which covers a cylinder head cover of the engine, and said self-discharge type static eliminator is placed on an outer wall surface of a connecting part of said noise suppressing cover to the cylinder head cover.

4. The engine as claimed in claim 3, wherein a projection is formed on the cylinder head cover of the engine, and the connecting part of the noise suppressing cover to the cylinder head cover is comprised of a tubular part which is integrally formed on a back surface of the noise suppressing cover and which can be engaged with said projection, said self-discharge type static eliminator being placed on the outer wall surface of said tubular part.

5. The engine as claimed in claim 1, wherein said engine part is comprised of a nonconductive engine component member which forms part of the engine body, and said self-discharge type static eliminator is placed on an outer wall surface of the connecting part of the engine component member with the engine body.

6. The engine as claimed in claim 5, wherein said engine component member is comprised of a plastic cylinder head cover.

7. The engine as claimed in claim 5, wherein said engine component member is comprised of a plastic intake manifold.

8. The engine as claimed in claim 5, wherein said engine component member is comprised of a plastic timing belt cover.

9. The engine as claimed in claim 1, wherein said self-discharge type static eliminator is comprised of metal foil which is bonded by a conductive adhesive on an outer wall surface of said engine part.

10. The engine as claimed in claim 9, wherein said self-discharge type static eliminator has corner portions for generating self-discharge.

11. The engine as claimed in claim 9, wherein said self-discharge type static eliminator has an elongated rectangular planar shape.

12. The engine as claimed in claim 1, wherein said self-discharge type static eliminator is comprised of a conductive thin film which is formed integrally on an outer wall surface of said engine part.

13. A method of production of an engine in which an engine body and a nonconductive engine part attached to the engine body carry a positive charge,
said method comprising:
using a self-discharge type static eliminator to lower an amount of charge carried on a wall surface of the nonconductive engine part in a limited range centered about a location of placement of said static eliminator,
determining a position of placement of said self-discharge type static eliminator on an outer wall surface of a connecting part of the engine part to the engine body where static electricity of the engine body can be eliminated, and
placing said self-discharge type static eliminator at the determined placement position.

14. The method as claimed in claim 13, wherein said engine part is comprised of a noise suppressing cover which covers a cylinder head cover of the engine, and said self-discharge type static eliminator is placed on an outer wall surface of a connecting part of said noise suppressing cover to the cylinder head cover.

15. The method as claimed in claim 14, wherein a projection is formed on the cylinder head cover of the engine, and the connecting part of the noise suppressing cover to the cylinder head cover is comprised of a tubular part which is integrally formed on a back surface of the noise suppressing cover and which can be engaged with said projection, said self-discharge type static eliminator being placed on the outer wall surface of said tubular part.

16. The method as claimed in claim 13, wherein said engine part is comprised of a nonconductive engine component member which forms part of the engine body, and said self-discharge type static eliminator is placed on an outer wall surface of the connecting part of the engine component member with the engine body.

17. The method as claimed in claim 16, wherein said engine component member is one of a plastic cylinder head cover, a plastic intake manifold, and a plastic timing belt cover.

18. The method as claimed in claim 13, wherein said self-discharge type static eliminator is comprised of metal foil which is bonded by a conductive adhesive on an outer wall surface of said engine part.

19. The method as claimed in claim 18, wherein said self-discharge type static eliminator has corner portions for generating self-discharge.

20. The method as claimed in claim 13, wherein said self-discharge type static eliminator is comprised of a conductive thin film which is formed integrally on an outer wall surface of said engine part.

* * * * *